Oct. 21, 1969    H. L. MARSHALL    3,474,295
SUPERCONDUCTIVE MAGNET EMPLOYING ONE POWER SUPPLY FOR
SEQUENTIAL ENERGIZATION OF SEPARATE WINDING SECTIONS
Filed Feb. 8, 1967

INVENTOR.
HARRY L. MARSHALL
BY
ATTORNEY

_United States Patent Office_

3,474,295
Patented Oct. 21, 1969

3,474,295
SUPERCONDUCTIVE MAGNET EMPLOYING ONE POWER SUPPLY FOR SEQUENTIAL ENERGIZATION OF SEPARATE WINDING SECTIONS
Harry L. Marshall, Palo Alto, Calif., assignor to Varian Associates, Palo Alto, Calif., a corporation of California
Filed Feb. 8, 1967, Ser. No. 614,648
Int. Cl. H02h 7/06, 7/08, 7/10
U.S. Cl. 317—13                                 4 Claims

ABSTRACT OF THE DISCLOSURE

Energizing circuits are disclosed for energizing high field superconductive magnets. The energizing circuit energizes the outside winding section of the magnet first such that the inside winding sections, which are located in the intense field of the magnet, are flux stabilized before being energized. After the outside winding section is fully energized the energizing circuits permit the same power supply to energize the inside winding sections. The energizing circuits include means such as a rheostat in one embodiment or a voltage regulated pass bank in another shunting the inside windings to prevent substantial energization of the inside winding sections during energization of the outside winding section.

Description of the prior art

Heretofore, separate power supplies have been employed for sequentially energizing the outside and then the inside winding sections of a high field superconductive magnet to permit flux stabilization of the inside windings before energization thereof. Thus, a number of "training" quenches of the superconductive magnet were eliminated during energization thereof. The problem with use of plural power supplies is that they are relatively expensive and it is desired to eliminate the second power supply, if possible.

Accordingly, in one prior art attempt to eliminate the second power supply a fixed low value resistive shunt was connected across the inside winding. The winding sections, both inside and outside, were then energized in series from the power supply. It was found that if the shunting resistor had too little resistance that the inside winding section initially had a negative current induced therein, by mutual inductive coupling to the outside winding, which subsequently reversed itself. This current reversal occurred at moderately high magnetic field intensity and produced substantial flux jumping resulting in undesired quenches of the magnet. On the other hand, when the resistance of the shunting resistor was chosen at a higher value to prevent a current reversal, the current in the inside coil reached too high a value before the outside windings had been stabilized at the desired current level thereby producing unwanted quenches of the magnet.

Summary of the present invention

The principal object of the present invention is the provision of improved means for energizing a superconductive solenoid.

One feature of the present invention is the provision of an energizing circuit, for type II superconductive magnets having outside and inside winding sections, wherein the energizing circuit includes a variable impedance shunt connected across the inside winding section of the magnet, whereby control over the impedance of the shunt during energization of the magnet, from a single power supply, permits the current in the inside winding section to remain at a low value while the current is building up in the outside winding to prevent unwanted quenches of the magnet during energization thereof.

Another feature of the present invention is the same as the preceding feature wherein the variable impedance shunt is a rheostat.

Another feature of the present invention is the same as the first feature wherein the variable impedance shunt is a regulated pass bank automatically regulated to maintain zero or nearly zero current in the inside winding section during build-up of current in the outside winding section.

Other features and advantages of the present invention will become apparent upon a perusal of the following specifications taken in connection with the accompanying drawings wherein:

Description of the preferred embodiments

Figure 1:
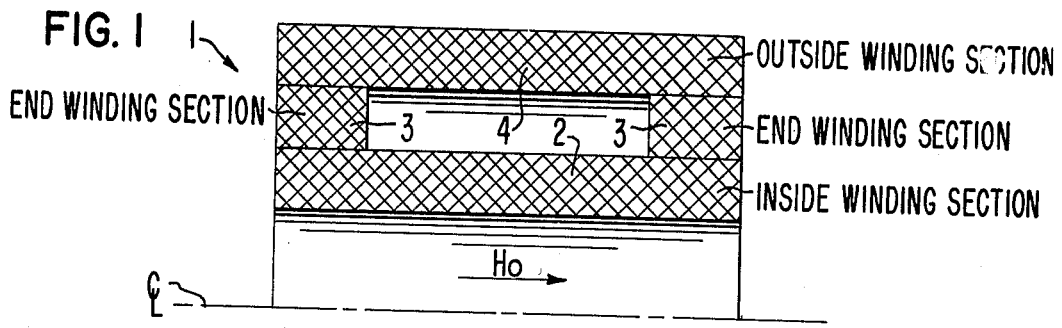
FIG. 1 is a fragmentary longitudinal sectional view of a superconductive magnet.

Referring now to FIG. 1, there is shown a superconductive magnet 1. The magnet 1 is a solenoid having a plurality of winding sections. More specifically, the magnet 1 comprises a series connection of an inside solenoidal winding section 2, a pair of end correcting winding sections 3 and a surrounding outside solenoidal winding section 4. The windings are made of many turns of type II superconductive wire such as Nb-Zr or Nb-Ti and when fully energized with current the magnet 1 produces an axial magnetic field H$o$ of, for example, 55 kg.

Figure 2:
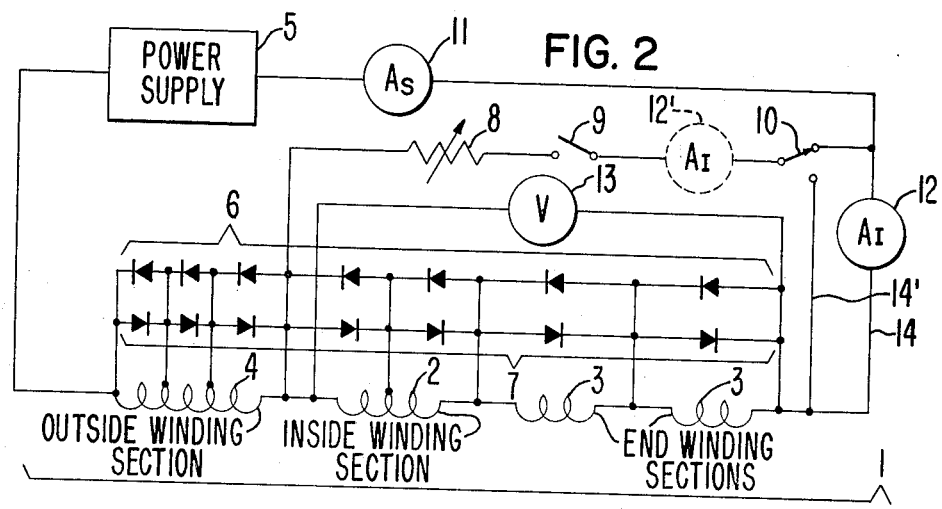
FIG. 2 is a schematic circuit diagram, partly in block diagram form, depicting a superconductive magnet energizing circuit of the present invention.

Referring now to FIG. 2, there is shown the magnet 1 together with its energizing circuit. The inside, outside and end winding sections 2, 4 and 3, respectively, are all series connected with a D.C. current power supply 5. The windings are immersed in a suitable cryostat, not shown, and cooled to liquid helium temperature of 4.2° K.

Two strings of diodes 6 and 7 are connected at intervals across the windings of the magnet 1 to prevent excessive voltages from being developed across segments of the windings when the magnet quenches, i.e., suffers a rapid transition from the superconductive to the normal conductive state. In addition, the diodes absorb the stored energy of the magnet 1 in their internal resistance and, thus, permit the magnet to be turned off without the stored energy of the magnet being dissipated as heat in the windings of the magnet. The double diode string is described and claimed in copending U.S. application 543,666 filed Apr. 19, 1966 and assigned to the same assignee as that of the present invention.

A rheostat 8 and a switch 9 are connected in shunt across tthe inside and winding sections 2 and 3, respectively, of the magnet 1. A first ammeter 11 is connected in series with the outside winding 4 and the shunted inside and end winding sections for indicating the current flowing through the outside winding section 4. A second ammeter 12 is connected into the circuit branch which is comprised by the shunted inside and end winding sections for indicating the current flowing through the inside and end winding sections 2 and 3. A voltmeter 13 is connected across the shunted inside and end winding sections 2 and 3 for indicating the voltage developed across these winding sections and, therefore, the rate of change of current in these sections.

In operation, the magnet 1 is energized as follows: Switch 9 is closed and the rheostat 8 is initially set for a very small value of resistance. The power supply 5 is programmed to feed a constantly increasing current into the magnet 1 until a predetermined current has been built-up. The operator monitors the voltage indicated by the voltmeter 13 and the current indicated by ammeter 12. The operator adjusts and modulates the rheostat 8 to keep both the voltage and current monitored at 13 and 12 at zero or nearly at zero during the build-up of current in the outside winding section 4 (see FIG. 3). Once the current has reached a predetermined value in the outside winding section 4, the rheostat 8 is adjusted and modulated to produce a constant rate of increase of current in the inside and end winding sections 2 and 3 and a constant voltage thereacross by shunting less of the current around the inside and end winding sections 2 and 3. When the current in the inside and end winding sections has built-up to the current level in the outside winding section 4, the switch 9 is opened and the magnet 1 may then be switched into a persistent mode by means, not shown.

Figure 3:
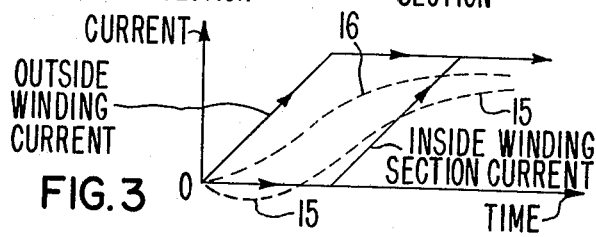
FIG. 3 is a diagram of energizing current versus time and depicting the current in the inside and outside winding sections for various conditions.

FIG. 3 also depicts the prior art inside and end winding section current vs. time characteristics when using a fixed shunting resistance instead of the rheostat 8. More particularly, dotted line 15 depicts the current characteristic for the inside winding section when employing a small fixed value of shunting resistance. Note the negative current region which leads to unwanted quenches of the magnet 1 after the current reverses at higher field intensities. Dotted line 16 shows the inside winding section current characteristic when the resistance of the shunt is fixed at a value sufficiently high to prevent a current reversal. In such a case, the current in the inside winding section reaches too high a value during the build-up of current in the outside winding section. Also the current in the inside winding section does not reach the same amplitude as that of the current in the outside winding section.

Alternatively, a switch 10 may be employed in the shunting circuit path to connect the shunt to the end of the superconductive winding section 3 via lead 14' rather than to include within the shunted winding section 2 and 3 the resistance of the lead 14 which includes ammeter 12. In this manner, essentially only zero resistance windings 2 and 3 are shunted by the shunt. In the modified circuit, the ammeter 12' is placed in the shunt path and reads the shunt current. With this alternative circuit, the current in the inside and end winding sections 2 and 3 will stabilize at the same current value as that flowing in the outside winding section 4.

Figure 4:
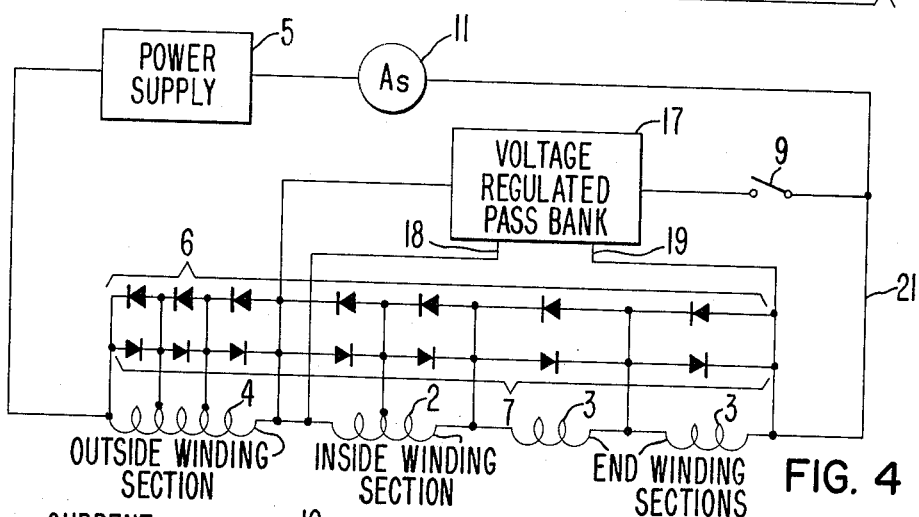
FIG. 4 is a schematic circuit diagram for an alternative embodiment of the energizing circuit of FIG. 2.

Referring now to FIG. 4, there is shown an alternative embodiment of the magnet energizing circuit of FIG. 2. In this embodiment, the apparatus is essentially the same as that of FIG. 2 except that the rheostat 8 is replaced by an electrically regulated variable impedance such as, for example, a voltage or current regulated transistor pass bank 17. The regulated pass bank 17 includes an internal circuit for controlling the impedance of the device in response to the voltage sensed across a pair of input terminals 18 and 19 which are connected across the inside and end winding sections 2 and 3, respectively. The voltage regulated pass bank 17 is programmed to maintain the voltage drop across the inside and end winding sections at zero volts during the build-up of the current in the outside winding section 4. After the current has stabilized at a constant value in the outside winding section 4, the voltage regulated pass bank 17 is programmed to maintain a constant voltage, as of 0.1 volt, across the inside and end winding sections indicating a constant rate of increase in the current through these winding sections. Such a rate of increase in the current is maintained, as depicted in FIG. 3, until the current is equal in both the outside winding 4 and the inside winding 2.

When using a transistor pass bank 17, lead 21 may conveniently have its resistance increased such that the minimum impedance of the transistors within the pass bank 17 may be increased to practical values.

As an alternative to voltage regulation of the pass bank 17, the pass bank 17 may be regulated by a signal derived directly from a measure of the current flowing through the shunted inside and end winding sections 2 and 3. Such a current measurement is conveniently obtained by an ammeter, not shown, placed in the circuit in the same place as ammeter 12 of FIG. 2.

In a typical example of a magnet and energizing circuit of the present invention the power supply delivers between 15 and 20 amps of current to a magnet 1 having an outside winding section 4 with 50,000 turns, an inside winding section of 50,000 turns and a pair of end winding sections 3 having 2,000 turns each. The rheostat provided a resistance variable from 0 ohms to 10 ohms. The magnet 1 produced a sixth-order corrected field uniform to 1 part in $10^7$ over a 0.6 inch diameter spherical volume at 60 kilogauss.

Since many changes could be made in the above construction and many apparently widely different embodiments of this invention can be made without departing from the scope thereof it is intended that all matter contained in the above description or shown in the accompanying drawings shall be interpreted as illustrative and not in a limiting sense.

What is claimed is:
1. In a superconductive magnet, means forming a magnet winding having an inside winding section surrounded by an outside winding section, means for connecting said inside and outside winding sections in series with a power supply for energizing the magnet with current, means forming an electrical shunt connected in series with said outside winding section and in parallel with said inside winding section for delaying the energizing current to said inside winding section relative to the energizing current in said outside winding section, the improvement wherein, said shunt means has an electrically regulated variable impedance such that by regulation of said shunt impedance during the build-up of current in said outside winding section the current in said inside winding section is regulated at a low value to prevent quenching of the magnet.

2. The appaartus of claim 1, including means responsive to the current flowing in said inside winding section during the build-up of current in said outside winding section for deriving a control signal and for feeding the control signal to said regulated shunt impedance for varying the impedance thereof to automatically maintain the current flowing in said inside winding section below a predetermined value during the build-up of current in said outside winding section.

3. The apparatus of claim 1 including means responsive to the voltage developed across said inside winding section during build-up of current in said outside winding section for deriving a control signal and for feeding the control signal to said regulated shunt impedance for varying the impedance thereof to automatically maintain the voltage developed across said inside winding section below a predetermined value during the build-up of current in said outside winding section.

4. In a superconductive magnet, means forming a magnet winding having an inside winding section surrounded by an outside winding section, means for connecting said inside and outside winding sections in series with a power supply for energizing the magnet with current, a rheostat connected in series with said outside winding section and in parallel with said inside winding section for delaying the energizing current to said inside winding section relative to the energizing current in said outside winding section, the improvement comprising, means for indicating the voltage developed across said inside winding section during buildup of current in said outside winding section whereby an operator may adjust said rheostat to maintain the voltage developed across said inside section below a predetermined value during buildup of current in said outside winding section.

References Cited

UNITED STATES PATENTS

| 3,176,195 | 3/1965 | Boom | 317—123 |
| 3,256,464 | 6/1966 | Stauffer | 317—123 |

LEE T. HIX, Primary Examiner

D. J. HARNISH, Assistant Examiner

U.S. Cl. X.R.

317—123; 335—216